March 21, 1961  H. R. A. KRESS  2,976,014
BLADING FOR USE IN AXIAL FLOW MACHINES
Filed Dec. 15, 1952
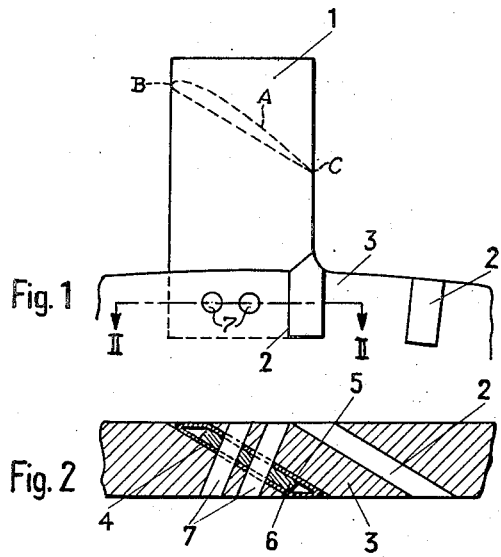
Fig. 1
Fig. 2
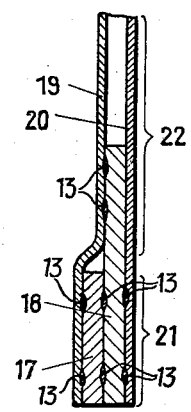
Fig. 6
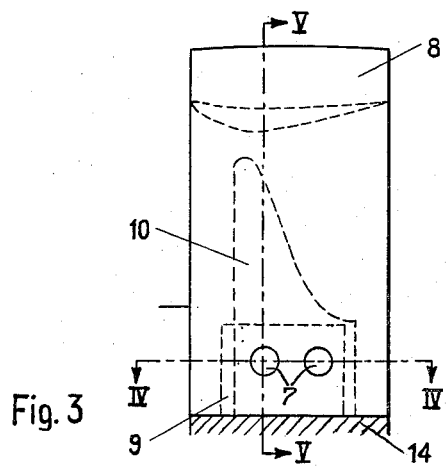
Fig. 3
Fig. 4
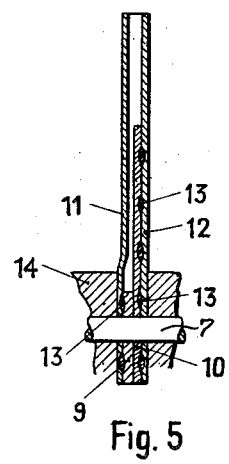
Fig. 5
INVENTOR:
Herwig R. A. Kress
By Dodge and Sons
Attorneys

United States Patent Office 2,976,014
Patented Mar. 21, 1961

2,976,014

BLADING FOR USE IN AXIAL FLOW MACHINES

Herwig Roland Aguilin Kress, Ravensburg, Germany, assignor, by mesne assignments, to Aktiengesellschaft Brown, Boveri & Cie., Baden, Switzerland, a corporation of Switzerland Filed Dec. 15, 1952, Ser. No. 325,974

Claims priority, application Switzerland Jan. 19, 1952

2 Claims. (Cl. 253—77)

The invention relates to a blading for use in axial flow machines, such as steam, gas and air turbines, axial compressors, blowers, air screws and the like.

In order to avoid the costly mechanical working of the complicated forms of guide blades and rotor blades in such machines, it has already been proposed to form the profile portion of the blades, the so-called blade body, as a hollow body by bending from sheet metal. The production of the blade body can thus readily be substantially simplified. However, in order to take up the forces to be transmitted a durable connection must be established between the blade, which is fashioned with a view to satisfying aerodynamic requirements, and the blade carrier, which is generally made somewhat robust for strength reasons. These forces may reach a considerable value, especially in the case of the rotor blading of a high-speed engine, owing to the centrifugal forces on the blades, and many proposals have already been made with a view to producing a reliable yet simple connection. Thus, for example intermediate elements have been provided, the production of which in turn necessitates considerable expenditure of labour, and studs have been formed on the rotor body by milling to act as blade carriers, to which the sheet metal profiles have been secured, for example by spot welding. In order to render such designs possible, profile forms have generally been chosen for the blade body which are not the best forms possible in accordance with the most recent development in flow dynamics, so that operating losses must constantly be tolerated in the interest of simple production.

With a blading according to the present invention, a simple but highly durable and rigid connection is obtained between hollow blades bent from sheet metal and the blade carrier by reason of the fact that the sheet metal forming the opposed faces of a hollow blade is confined with the interposition of at least one filler element in the region in which the blade is fitted in a slot in the blade carrier and is there held fast by connecting elements extending through the blades and the blade carrier.

In cases where the stresses are low, no special connection is required between the filler elements and the sheet metal of the hollow blade, but if high strength is required, it is expedient to connect at least one filler element by welding at least one of its faces to an inner face of the hollow blade. By welding is meant here a welding operation of any kind, more particularly one including spot welding or solder welding.

Various constructional forms of the subject of the invention are illustrated by way of example in the accompanying drawings, in which:

Figure 1 is an elevation of a part of the blading of an axial compressor as seen in the direction of the axis of the engine, Figure 2 is a section through the blading on the line II—II of Figure 1, Figure 3 shows an elevation of a modification of the blade comprising two filler elements, one of which extends into that region of the blade which is subjected to the action of the flow, so that it may serve also as a reinforcing element, Figure 4 is a transverse section on the line IV—IV of Figure 3, Figure 5 is a longitudinal section on the line V—V of Figure 3, and Figure 6 is a section along the longitudinal axis of a modified constructional form of a blade comprising two reinforcing and filler elements.

The hollow blades formed of bent sheet metal in the blading of a rotor according to Figures 1 and 2 are each fitted in a slot 2 in the blade carrier 3, which in this case is formed as a rotor disc. Only one hollow blade bearing the reference numeral 1 is shown in Figs. 1 and 2. In accordance with the position of the blade profile as diagrammed in chain lines at A in Figure 1, the slots 2 are formed obliquely in the rotor disc 3. One of the opposed sides of the blade, the pressure side of the blade profile, is towards the viewer in Fig. 1 and the other side, the suction side, is away from the viewer. The sheet metal forming the suction side and the pressure side of the blade may be in one piece which is bent over along the inlet edge B of the blade and welded together along the outlet edge C. In the region fitted into slot 2, the sheet metal 4 forming the pressure side of the blade profile and the sheet metal 5 forming the suction side of the blade profile are spaced by an interposed appropriately shaped filler element 6 so that the cross-section is substantially a parallelogram and fills the slot. Moreover, the blade is held fast in the slot by two connecting elements shown as pins 7 extending through the blade and the blade carrier 3.

Figs. 1 and 2 are intended primarily to illustrate external form and the nature of the slot which receives the root. Details as to welds, the use of laminated filler units, etc. may follow any of Figs. 3 to 6 inclusive. The filler element in Figs. 1 and 2 is not laminated, the use of a single filler being within the broad scope of the invention.

Figures 3 to 5 show as a further constructional example a blade 8 for an axial compressor, in which two filler elements 9 and 10 are disposed between the sheet metal walls 11 and 12 forming the suction and pressure sides of the hollow blade. The filler elements 9 and 10 may consist of sheet metal and they are shown connected to the adjacent sheet metal blade walls 11 and 12 by spot welding. The respective spot welds 13 can conveniently be produced before the sheet metal blade parts 11 and 12 have been bent over about the inlet edge B, so that each packing element can be separately connected to the adjacent sheet metal blade wall.

As will be seen, the filler member 10 is also a reinforcing element since it extends within the blade into a region thereof which is outside the blade carrier, and is connected in this region to the sheet metal wall 12 of the blade by a weld indicated at 13. The advantage of a better transmission of the centrifugal forces on the blade to the securing point and also of a stiffening of the blade is thus obtained. Moreover, as indicated in chain lines in Fig. 3, the cross-section of the packing element 10 extending into the region of the blade outside the blade carrier decreases with the distance from the blade carrier 14. This is permissible because the forces to be transmitted decrease outward. The additional advantage is afforded that the centrifugal force exerted by the filler element itself is minimized.

When the filler element is laminated, it is ordinarily sufficient to extend only one lamina into that portion of the blade which extends outside the blade carrier. Fig. 5 shows such an arrangement and also indicates that welds between laminae may be omitted.

It will be seen from the section on the line IV—IV of Figure 3 which is shown in Figure 4 that the filler elements 9 and 10 are arranged in laterally offset formation in relation to one another, whereby the surface of contact between the sheet metal walls 11 and 12 of the blade and the filler elements 9 and 10 respectively can be made somewhat larger than in the construction shown in Fig. 2, comprising only one filler element. In the construction of Figs. 3, 4 and 5, pins 7 similar to the pins 7 of Figs. 1 and 2 are used.

Figure 6 illustrates another manner of welding the filler elements to the sheet metal of the blade. Of the filler elements 17 and 18 only the element 18 extends into that region of the blade which is outside the blade carrier, the said blade consisting of the sheet metal walls 19, 20, which form the opposed sides of the blade. The filler element 18 is in this case connected by welding to the sheet metal wall 20 in the region 21 in which the blade is fitted into the slot in the blade carrier (not shown) and to the sheet metal wall 19 in the region 22 which is outside the blade carrier. A substantially rectilinear flow of force from the sheet metal blade parts 19 and 20 through the packing elements 17, 18 to the blade carrier (not shown) is thus obtained. The packing elements 17, 18 are also interconnected by welds 13, as shown.

The described embodiments merely represent examples of the possible constructions, which may be varied in many respects in accordance with the existing conditions. Thus, for example, the use of a particular number of shear pins, such as the two illustrated, is not critical nor is their angle to the blade-receiving slot. Obviously a rectangular slot with plane parallel faces is the very simplest to machine, and favors a simple form of blade-root. The construction of the rotor is subject to variation within the range of choice offered by the art.

As is shown in Figure 4, gaps 15, 16 may be left between the packing elements 9 and 10 and the sheet metal parts 11 and 12 forming the blade profile, to permit the passage of a fluid medium. Such a constructional form may be desirable, for example, when it is desired to cool a hollow blade by a cooling medium.

What is claimed is:

1. A blade-mounting for use in axial flow machines, said mounting comprising a blade carrier having slots formed obliquely in the perimeter thereof, said slots having plane parallel faces; hollow sheet-metal blades each having a blade portion proper, and a root portion, the latter in the form of a hollow prism whose cross-section approximates a parallelogram conforming to the cross-section of the corresponding slot, whereby each root portion fills its slot; filling and reinforcing means for said blades each comprising at least two sheet metal laminae which are offset laterally and together approximate the internal cross-section of the root portion, at least one of said laminae having a spanwise length corresponding to the spanwise length of the root portion and another of said laminae being longer so as to extend into the blade portion proper; welds connecting relatively remote faces of the two laminae just mentioned to internal surfaces of the hollow blade; and means for fixing each root portion in its corrosponding slot.

2. A blade-mounting for use in axial flow machines, said mounting comprising a blade carrier having slots formed obliquely in the perimeter thereof, said slots having plane parallel faces; hollow sheet-metal blades each having a blade portion proper, and a root portion, the latter in the form of a hollow prism whose cross-section approximates a parallelogram conforming to the cross-section of the corresponding slot, whereby each root portion fills its slot; filling and reinforcing means for said blades each comprising at least two sheet metal laminae which are offset laterally and together approximate the internal cross-section of the root portion, at least one of said laminae having a spanwise length substantially equal to the spanwise length of the root portion and another of said laminae being longer so as to extend into the blade portion proper; welds connecting relatively remote faces of the two laminae just mentioned to internal surfaces of the hollow blade; welds connecting contacting faces of said laminae; and means for fixing each root portion in its corresponding slot, said means comprising at least one pin extending through said blade carrier, said root portion and said filling and reinforcing means.

References Cited in the file of this patent

UNITED STATES PATENTS

| | | |
|---|---|---|
| 849,992 | Frikart | Apr. 9, 1907 |
| 995,367 | Patitz | June 13, 1911 |
| 1,050,187 | Westinghouse | Jan. 14, 1913 |
| 1,516,607 | Johanson | Nov. 25, 1924 |
| 1,530,249 | Eveleth | Mar. 17, 1925 |
| 2,559,131 | Oestrich et al. | July 3, 1951 |
| 2,642,263 | Thorp | June 16, 1953 |
| 2,650,803 | Rosskopf | Sept. 1, 1953 |

FOREIGN PATENTS

| | | |
|---|---|---|
| 16,889 | Great Britain | Oct. 20, 1910 |